United States Patent [19]

Makino

[11] 4,282,896
[45] Aug. 11, 1981

[54] PILOT OPERATED CHECK VALVE

[75] Inventor: Yoshihiro Makino, Takamatsu, Japan

[73] Assignee: Shinei Mfg. Co., Ltd., Takamatsu, Japan

[21] Appl. No.: 40,880

[22] Filed: May 21, 1979

[51] Int. Cl.³ .............................................. F16K 15/06
[52] U.S. Cl. .................................... 137/495; 137/496; 137/516.29; 137/522; 137/538; 137/543.23; 251/DIG. 1
[58] Field of Search .............. 137/496, 516.25, 516.27, 137/516.29, 538, 540, 543.23, 495, 522, 523; 251/210, 332, DIG. 1

[56] References Cited

U.S. PATENT DOCUMENTS

| | | | |
|---|---|---|---|
| 2,960,998 | 11/1960 | Sinker | 137/543.23 X |
| 3,053,501 | 9/1962 | Varga | 137/516.29 X |
| 3,072,143 | 1/1963 | Fleischhacker | 137/516.29 X |

FOREIGN PATENT DOCUMENTS

| | | | |
|---|---|---|---|
| 1123634 | 2/1962 | Fed. Rep. of Germany | 137/516.29 |
| 45024 | 9/1961 | Poland | 137/538 |

*Primary Examiner*—Robert G. Nilson

[57] ABSTRACT

A pilot operated check valve for high pressure service utilizing an O-ring is disclosed, wherein a poppet valve having a seating surface for engagement with a valve seat is provided on its front side with a spool member formed integrally therewith and projecting axially therefrom, an O-ring mounting groove is provided on the spool member in abutment relation with the seating surface of the poppet valve opposed to the valve seat so that the O-ring mounted in the groove may be positioned in a fluid passageway extending through a partition wall between primary-side and secondary-side fluid compartments. The spool member has a passage for fluid flow formed on it which extends from its front end facing the primary-side fluid compartment to the surface of the spool member adjacent the O-ring mounting groove.

10 Claims, 9 Drawing Figures

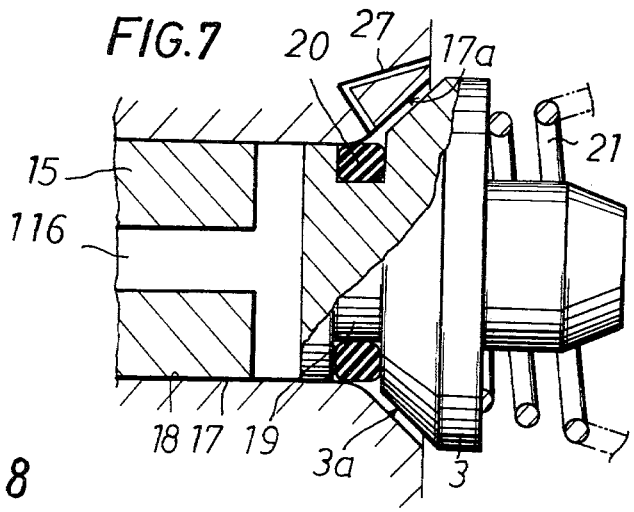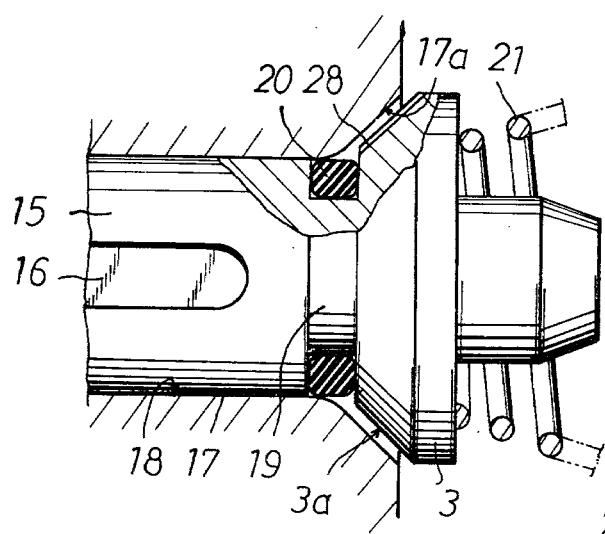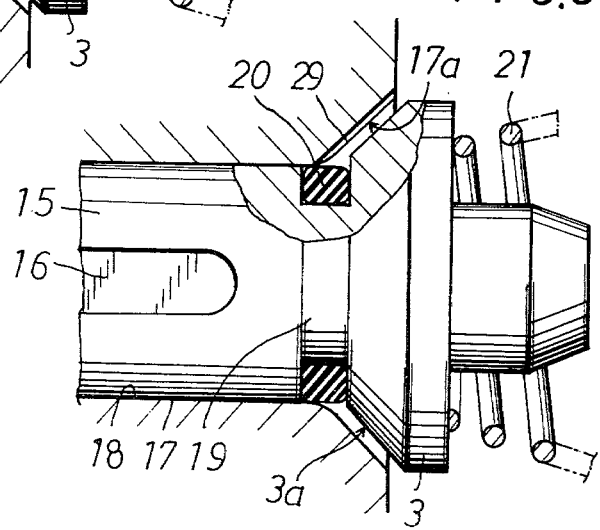

PILOT OPERATED CHECK VALVE

BACKGROUND AND SUMMARY

This invention relates to a pilot operated check valve for high pressure service utilizing an O-ring form of seal.

When pilot operated check valves are employed in circuits where the difference in fluid pressure between the outlet side and the inlet side is insubstantial or in check valves which have not pilot operation means, an O-ring is commonly used in the valve seat or the seating surface of the poppet valve to provide an oil seal between the valve seat and the poppet valve. However, no known pilot operated check valves utilize an O-ring for this oil seal when a substantial pressure difference such as 70 or 100 atm. P. exists between the outlet side and the inlet side. The reason is that where the pressure on the outlet side is extremely high relative to the pressure on the inlet side and the poppet valve is piloted toward the open position by mechanical or hydraulic means, the O-ring which has been functioning as a seal between the poppet valve and the valve seat is instantly forced out of the ring groove as the clearance between the poppet valve and the valve seat exceeds the threshold extrusion clearance limit (which is determined by the hardness of the O-ring used and the level of hydraulic pressure).

The pilot operated check valves for high pressure service known heretofore are of metal fit type. This type has a disadvantage in that no sufficient sealing is provided, with the result that oil leakage occurs in the course of time. As an approach to eliminate such oil leakage, there is a pilot operated check valve design of metal fit type in which the poppet valve and the valve seat are respectively constructed of metals having different degrees of hardness so that pressure sufficient to bring one of the metals to its yield point may be acted upon the poppet valve in the presence of a difference in pressure between the primary side and the secondary side.

Previous attempts have been made to provide a pilot operated check valve in which an O-ring serves as a perfect oil seal and will not be forced out of the ring groove during valve opening operation even where the difference in pressure between the inlet side and the outlet side is substantial. The present inventor previously proposed a pilot operated check valve comprising a spool 15' formed integrally with a poppet valve 3' on the front side thereof and projecting axially therefrom, as shown in FIG. 1, a fluid flow groove 16' provided on the spool 15' and extending from the front end thereof to a surface position adjacent the rear end thereof, an O-ring mounting groove 19' formed on a seating surface 3'a of the poppet valve 3' adapted for engagement with a valve seat 17'a, an O-ring 20' mounted in the O-ring mounting groove 19', the spool 15' being slidably and closely fitted into a fluid passageway 18' extending through a partition wall 17' defining the valve seat 17'a (Japanese Patent Publication No. 45009/1978, dated Dec. 4, 1978). In this pilot operated valve, as seen from FIG. 2 showing a key portion thereof in section, the O-ring mounting groove 19' is formed on the seating surface 3'a of the poppet valve 3' opposed to the valve seat 17'a. The O-ring 20' mounted in the groove 19' is squeezed against the surface of the valve seat 17'a when the seating surface 3'a is forced into engagement with the valve seat 17'a. As such, the O-ring mounting groove 19' is formed in shallow relation with the peripheral surface 15'a of the spool 15' and accordingly the O-ring 20' protrudes substantially beyond the peripheral surface 15'a of the spool 15'. However, it has been found that the pilot operated check valve as shown in FIGS. 1 and 2 still involves the following difficulties. When the poppet valve 3' is piloted to the open position against the high-level hydraulic pressure on the secondary side, the O-ring 20' is subject to a substantial shear force due to the secondary-side hydraulic pressure acting on that portion of the O-ring 20' which protrudes outwardly beyond the peripheral surface 15'a of the spool 15' to force it against the valve seat 17'a. The O-ring is also subject to the pilot pressure acting along a circumferential edge 19'a of the spool 15' abutting the O-ring mounting groove 19' to force it against the secondary-side hydraulic pressure. Another difficulty is that if no pressure or a very low pressure is present on the secondary-side, it is impracticable to permit the outer periphery of the O-ring 20' to get squeezed against the valve seat 17'a to the extent that the O-ring is deformed in section under the force of the spring 21' only. Such deformation is likely to lead to oil leakage in the course of time.

It is a primary object of this invention to provide a pilot operated check valve having improved features over the above said design and which eliminates the above mentioned difficulties and better facilitates pilot operation. The improvement includes a spool member formed integrally with and projecting axially from the front side of a poppet valve having a seating surface for engagement with a valve seat. An O-ring mounting groove is provided on the spool member in abutment relation with the front side of the poppet valve, and a passage or opening for fluid flow is provided in the spool member. The passage or opening connects a fluid compartment on the primary side and a surface of the spool member adjacent the O-ring mounting groove. An O-ring is mounted is the O-ring mounting groove. The spool member is slidably and closely fitted in a fluid passageway which extends through a partition wall defining the valve seat so as to permit the O-ring to be positioned in the fluid passageway upon the seating surface of the poppet valve being brought into engagement with the valve seat. The improvement further comprises a small groove or hole bored and extending through the poppet valve or through the partition wall for communication between the secondary side of the O-ring mounting groove sealed by the O-ring and a secondary-side fluid compartment separated from the primary-side fluid compartment by the partition wall. In addition, the corner edge of the secondary-side end of the fluid passageway is flared so as to provide a curved surface for guiding the O-ring into the fluid passageway.

Other features, objects and advantages of this invention will become apparent from the following detailed description of embodiments with reference to the accompanying drawing.

DESCRIPTION OF THE DRAWING

FIGS. 7, 8 and 9 are enlarged views similar to FIG. 6, showing other embodiments of the invention.

DESCRIPTION OF THE PREFERRED EMBODIMENTS

Figure 1:
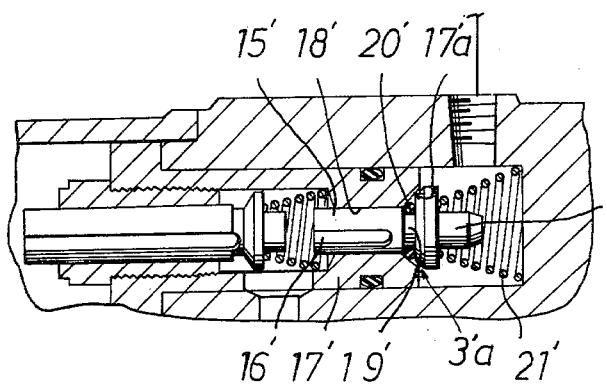
FIG. 1 is a side elevational view in section showing a prior art pilot check valve by way of example.
Figure 3:
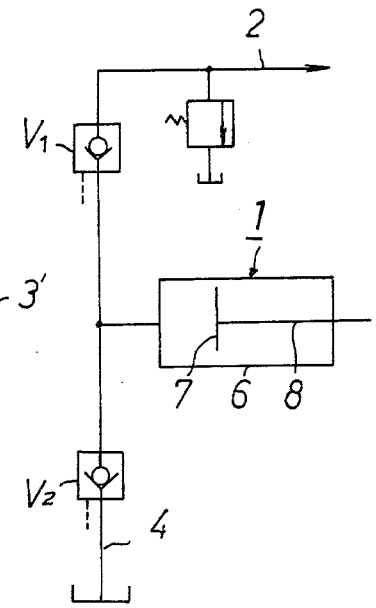
FIG. 3 is a schematic diagram of a circuit for a pump apparatus.
Figure 2:
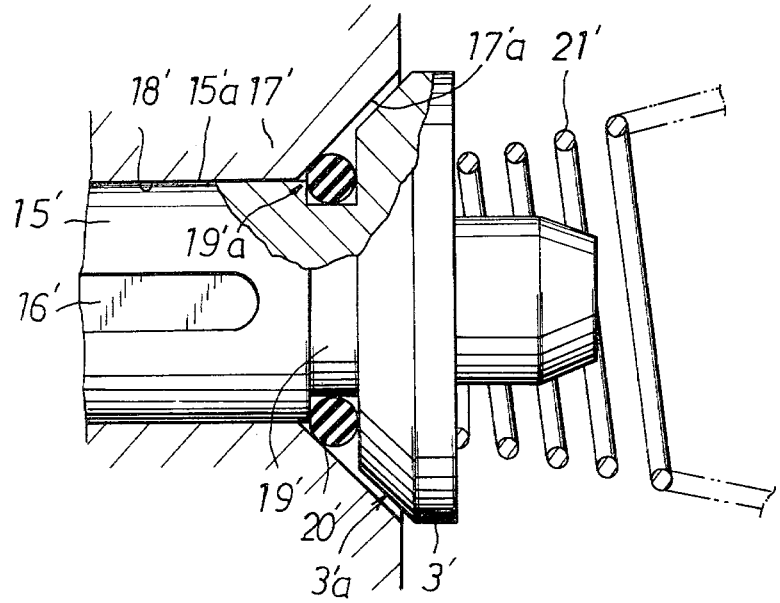
FIG. 2 is an enlarged view of a key portion of FIG. 1.

FIG. 3 illustrates by diagram a pumping apparatus in which the pilot operated check valve V1 of this invention is employed as a valve means for a pump 1. A discharge circuit 2 in the pump is connected to a vice means (not shown) utilizing hydraulic pressure. The pilot operated check valve V1 in accordance with the invention, as incorporated in the discharge circuit 2, is arranged in conjunction with another pilot operated check valve V2 incorporated in a suction circuit 4 in the pump 1, as described In FIGS. 4 through 6, numeral 6 designates a cylinder of the pump 1, numeral 7 a piston housed in the cylinder 6, numeral 8 a piston rod, and numeral 9 a spring which constantly forces the piston 7 toward the right. When the piston rod 8 is pushed toward the left, oil in the cylinder 6 passes through a fluid passageway 10 and into a compartment 11. The oil then passes through the check valve V1 by forcing it open and is discharged through an outlet port 12 into the discharge circuit 2 (the secondary side), whereupon the check valve V2 is closed. When the piston rod 8 is released, the piston 7 is pushed back to the right by the spring 9, and oil stored in a housing 1a in the pump 1 forces the check valve V2 open and passes through the compartment 11 (the primary side) and the fluid passageway 10 into the cylinder 6, whereupon the check valve V1 closes. In the present case, the arrangement is such that the hydraulic pressure in the discharge circuit 2 (the secondary side) may be maintained at a high level. Check valves V1 and V2 may opened and moved to the right by a longitudinally slidable control lever 13 which passes through the housing 1a against springs 21 and 22. More concretely, as a poppet valve constituting the check valve V2 is pushed by the front portion 13a of the control lever 13 against the spring 22, the check valve V2 is opened. As the control lever 13 is further pushed toward the right against both the force of the spring 21 and the hydraulic pressure on the secondary side, a poppet valve 3 constituting the check valve V1 is pushed by the poppet valve 5 and thus the check valve V1 is opened. Thus, it is noted that the check valves V1 and V2, both are piloted to their open position by mechanical means.

In the pilot check valve V1, the passage of return on the high pressure side (the secondary side) is checked as follows. The pilot operated check valve V1 includes a spool member 15 formed integrally with and projecting axially from the front side of a poppet valve 3 having a seating surface 3a for engagement with a valve seat 17a. The spool member 15 is slidably and closely fitted in a fluid passageway 18 which extends through a partition wall 17 defining a valve seat 17a. On the spool member there is provided an annular O-ring mounting groove 19 in abutment relation with the seating surface of the poppet valve 3, the O-ring mounting groove 19 being of such a width W that more than one-half of the outer periphery of the groove may be positioned in the fluid passageway 18 when said seating surface is in engagement with the valve seat 17a, with an O-ring mounted therein. The depth d of the O-ring mounting groove 19 is slightly smaller than said groove width W. In the case where there is only an insignificant pressure difference between the primary-side and secondary-side compartments separated by the partition wall 17 and where the poppet valve 3 is forced toward the valve seat 17a only by a hydraulic pressure on the secondary side and the spring 21, the O-ring 20 mounted in the groove 19 does not allow the poppet 3 to engage with the valve seat 17a, even if the O-ring 19 is inserted, in a somewhat deformed state, in the fluid passageway 18 to a position abutting the inner peripheral surface thereof. Only when the poppet valve 3 is acted upon by a high level pressure on the secondary side, may the O-ring 20 be completely positioned at a position enclosed between the groove 19 and the inner periphery of the fluid passageway 18 and thus the seating surface of the poppet valve 3 be brought into complete engagement with the valve seat 17a. On the spool member 15 there is provided a groove 16 for fluid passage extending from the front end (left end) of the spool member 15 to a surface adjacent the O-ring mounting groove 19. Instead of the groove form as shown in FIG. 6, the passage may be a fluid passage opening 116 extending up to above said surface position, as shown in FIG. 7.

Figure 6:
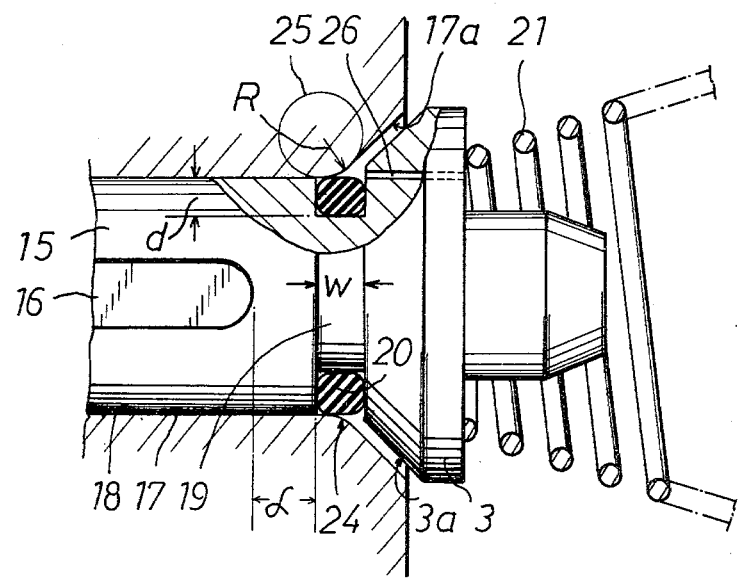
FIG. 6 is an enlarged view of the pilot operated check valve shown in FIG. 4.

Further in accordance with the present invention, the poppet valve 3 is provided with a small hole or orifice 26 bored therein and extending from the outlet side 12 to the secondary side of the O-ring mounting groove 19 sealed by the O-ring 20, i.e., the right side of the O-ring 20 (as seen in FIG. 6).

The small hole or orifice 26 provided in the poppet valve 3 for communication between the right side of the O-ring (FIG. 6) and the outlet side in a restricted state may be substituted by small hole or orifice 27 bored through the partition wall 17 as shown in FIG. 7. In other forms, the restricted fluid passage may be a narrow groove 28 or 29 formed on the surface of either the poppet valve 3 or valve seat 17a as shown in FIG. 8 or FIG. 9.

The operation of the pilot operated check valve V1 according to this invention will now be explained. As already stated, the O-ring mounting groove 19 is disposed on the spool member 15 projecting from the front side of the poppet valve 3 so that it will not engage with the valve seat 17a and so that it may be received in the fluid passageway 18, with the O-ring 20 inserted in the groove in such a way as above described. Unlike conventional check valves, the check valve of the present invention insures that oil sealing is positively achieved between the poppet valve 3 and the valve seat 17a by O-ring 20 being mounted in the O-ring mounting groove 19 while more than one-half of the peripheral surface of the O-ring 20 is inserted in the fluid passageway 18. In other words, satisfactory oil sealing can be accomplished by the O-ring 20 being deformed under pressure in the primary-side direction in an annular space enclosed by the O-ring mounting groove 19 and the inner peripheral surface of the fluid passageway 18. This result can be successfully obtained not only where a high level pressure is maintained on the secondary side, but also where pressure difference between the primary side and the secondary side is insignificant.

During reverse flow checking operation, as earlier mentioned, the O-ring 20 mounted in the O-ring mounting groove 19 has more than one-half of its outer peripheral surface positioned in the fluid passageway 18 under hydraulic pressure on the secondary side or force of the spring 21. The O-ring 20 is not squeezed against the surface of the valve seat 17a. The corner edge 24 at the secondary side end of the fluid passageway 18 defining the valve seat 17a is flared to provide a curved surface (an arc with the radius R of a virtual circle 25 in a sectional configuration) suitable for smoothly guiding the O-ring 20 into the fluid passageway 18. Because of this arrangement, the O-ring is completely protected against surface damage due to contact with the corner edge of the valve sheet.

Figure 4:
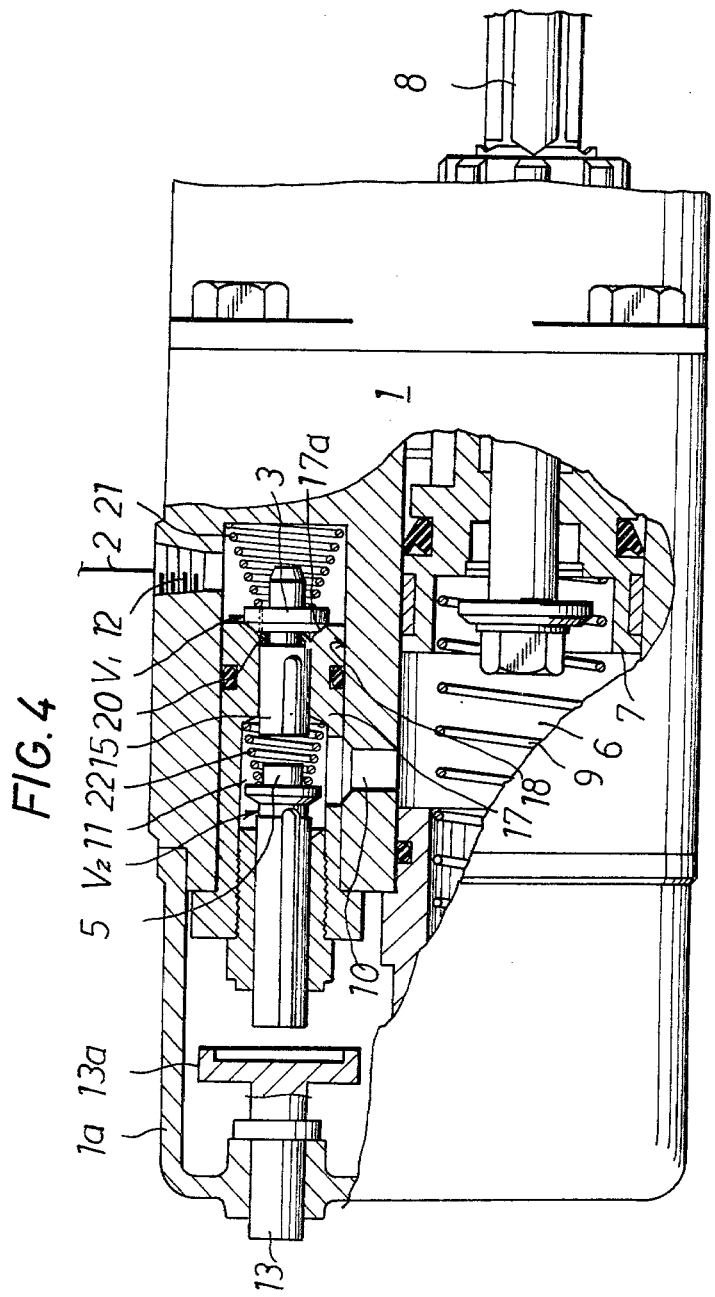
FIG. 4 is a side elevational view in section of a hydraulic pump utilizing a pilot operated check valve according to this invention.
Figure 5:
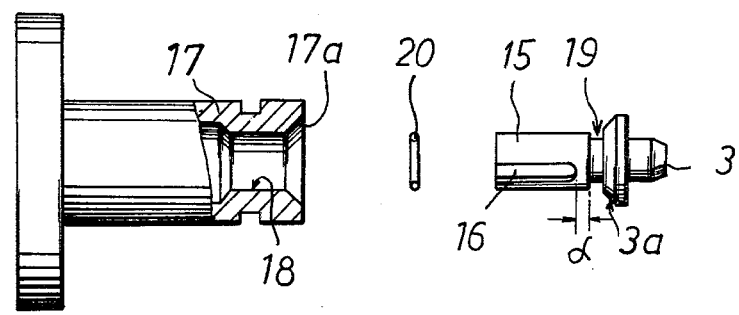
FIG. 5 is an exploded view of a key portion of FIG. 4.

In the pilot operated check valve V according to this invention, it is specifically noted that the poppet valve 3 has on the front side thereof a spool member formed integrally therewith and projecting therefrom. The spool member 15 slidably and closely fits in the fluid passageway 18 extends through the partition wall 17 defining the valve seat 17a. The groove 16 for fluid passage provided in the spool member 15 extends to a location adjacent the rear end of the spool member 15 and not to the rear end or a position at which the O-ring closely engages the inner peripheral surface of the fluid passageway 18. It is further noted that when the O-ring is inserted in the fluid passageway 18 in close contact with the inner peripheral surface thereof, fluid flow between the valve seat 17a and the fluid groove 16 is shut off by a part of the spool member 15 other than the grooved portion thereof. Fluid flow shut-off by other than the grooved part of the spool member 15 is maintained by a close engagement between the spool member 15 and the fluid passageway 18 into which the former is fitted until the poppet valve 3, after the closed position as seen in FIG. 4, is caused to slide toward the right by a stroke corresponding to the distance α between the rear end of the fluid groove 16 (FIGS. 4-6) and the front end of the O-ring mounting groove 19. When the spool member 15 and the fluid passage 18 are in close engagement with each other, the fluid flow between the outlet 12 side and the compartment 11 is substantially shut off, and the poppet valve 3 is pushed by the control lever 13 toward the open position via the poppet valve 5, the O-ring 20 is forced out of the fluid passageway 18 (then separated from the valve seat 17a) and positioned at a location in a complete high pressure state (where no pressure difference is present). At this point the poppet valve 3 completes a stroke of above said α distance. Then, the outlet port 12 side or the secondary side communicates with the inlet side of the check valve V1, that is, compartment 11 (the primary side) via fluid groove 16. Because of this mechanism, the O-ring 20 will never be forced out of the ring groove 19 during valve opening operation.

Moreover, as seen from the above description of the embodiments, the secondary side of the O-ring mounting groove 19, that is, the right side of the O-ring 20, communicates with the outlet port 12 in a restricted way through a small hole or orifice 26 (or 27) or a narrow groove 28 (or 29) (FIGS. 6-9). Therefore, even if, in the course of prolonged use, the poppet valve 3 becomes liable to engage with the valve seat 17a in a closely united or solidly drawn-together state, the valve opening operation can be easily carried out without the direct impact of a secondary-side high pressure corresponding to the area of contact between the poppet valve 3 and the valve seat 17a and only against a less significant pressure corresponding to the sectional area of the spool member 15.

As described above, it is possible to utilize an O-ring in a pilot operated check valve without the O-ring being forced out of the ring groove, with the assurance of safe and easy piloting operation. In its closed state, the pilot operated check valve of this invention assures complete sealing because of the O-ring used in it where a high-level pressure is present on the secondary side, as well as where pressure difference between the primary side and the secondary side is insignificant. Further, the invention assures longer service life and more effective use of the O-ring since it is not subject to shear force due to pilot pressure and secondary-side hydraulic pressure at any surface or edge of the O-ring mounting groove contacts.

While in the foregoing specification a detailed description of an embodiment of the invention has been set down for the purpose of illustration, many variations in the details herein given may be made by those skilled in the art without departing from the spirit and scope of the invention.

I claim:

1. A pilot operated check valve comprising a poppet valve movable into engagement with a valve seat defined by a partition wall between a primary-side fluid compartment and a secondary-side fluid compartment by action of hydraulic pressure on the secondary side and adapted to close on the secondary side, a fluid passageway extending through the partition wall, means for actuating the poppet valve so as to move it out of engagement with the valve seat against hydraulic pressure on the secondary side, said poppet valve having a spool member integrally therewith on a front side thereof and adapted to slidably and closely fit into said fluid passageway, and O-ring mounting groove provided on said spool member in abutment relation with a seating surface of said poppet valve opposed to said valve seat so that an O-ring may be positioned in said fluid passageway upon said seating surface being brought into engagement with said valve seat, said O-ring mounted in said groove, a passage for fluid flow in said spool member leading from the front end of said spool member facing the primary-side fluid compartment to the secondary-side end surface of said spool member adjacent said O-ring mounting groove, at least a portion of said O-ring mounting groove communicating with said secondary-side fluid compartment through a restricted fluid passage.

2. A pilot operated check valve as defined in claim 1, wherein said restricted fluid passage is a small hole or orifice bored through said poppet valve.

3. A pilot operated check valve as defined in claim 1, wherein said restricted fluid passage is a small hole or orifice bored through said partition wall.

4. A pilot operated check valve as defined in claim 1, wherein said restricted fluid passage is a narrow groove provided on the seating surface of said poppet valve opposed to said valve seat.

5. A pilot operated check valve as defined in claim 1, wherein said restricted fluid passage is a narrow groove provided on the surface of said valve seat.

6. A pilot operated check valve as defined in any of claims 1 to 5, wherein a corner edge of said secondary-side end of said fluid passageway is flared so as to provide a curved surface for guiding said O-ring into said fluid passageway, an extension of said curved surface defining said valve seat.

7. A pilot operated check valve as defined in any of claims 1 to 5, wherein said passage for fluid flow is a groove formed on the outer surface of said spool member.

8. A pilot operated check valve as defined in any of claims 1 to 5, wherein said passage for fluid flow is an opening for passage of fluid flow passing through said spool member.

9. A pilot operated check valve as defined in claim 6, wherein said passage for fluid flow is a groove formed on the outer surface of said spool member.

10. A pilot operated check valve as defined in claim 6, wherein said passage for fluid flow is an opening for passage of fluid flow passing through said spool member.

* * * * *